INVENTORS
HENRY E. LEAKE
WILLIS L. FERRELL
JOHNNIE W. GOSNELL

BY Raymond Wootten

ATTORNEY

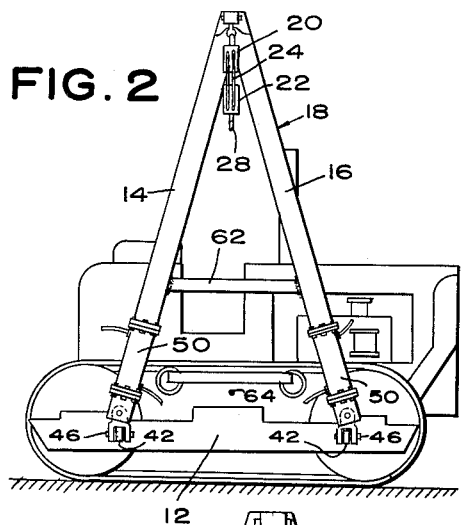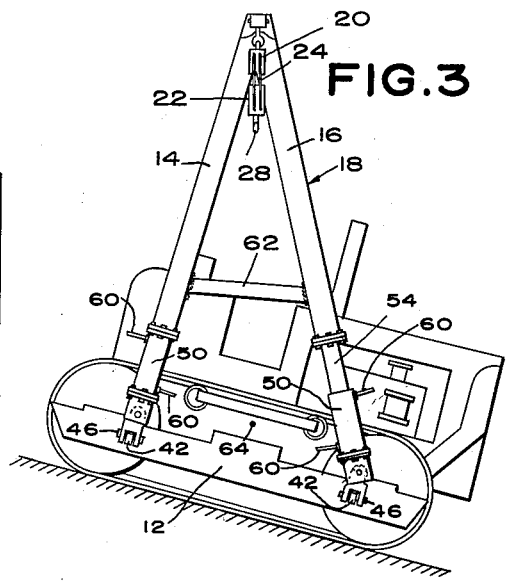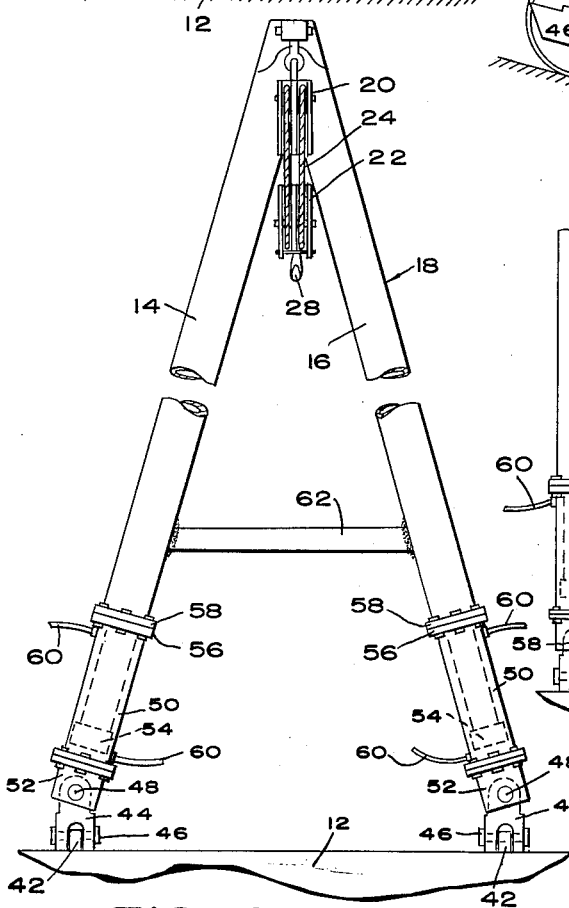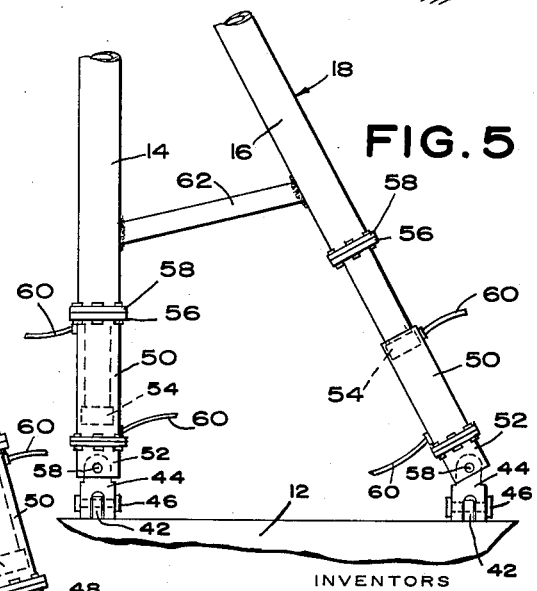

United States Patent Office 3,058,600
Patented Oct. 16, 1962

3,058,600
HANDLING VEHICLE
Henry E. Leake, 7880 Mission St., Colma, Calif., and Willis L. Ferrell and Johnnie W. Gosnell, both of 46 Fair Lawn Ave., Daly City, Calif.
Filed Apr. 17, 1959, Ser. No. 807,053
12 Claims. (Cl. 212—8)

This invention relates to a handling vehicle and will be described with reference to a side boom tractor of the type frequently utilized in the laying of pipe lines.

Side boom tractors which have been commercially available for the laying of pipes prior to this time have provided no way to shift the position of the block in a fore and aft direction relative to the tractor, so that when the tractor is operating in an inclined position, the block will be forward or aft of a vertical plane extending transversely of the tractor through its center of gravity. For this reason, the lifting height of commercial equipment has been reduced where the terrain is sloping and the danger of the tractor tilting and turning over is ever present.

It is among the objects of the present invention to provide improvements in vehicles of this class whereby the boom can be adjusted to locate the block so that a vertical transverse plane through the center of gravity of the tractor will also include the center of the block. Such an arrangement increases the lifting capacity of the vehicle and also increases safety to the operating personnel.

It is proposed in accordance with the present invention to provide a handling vehicle comprising a frame, the vehicle having a center of gravity, a longitudinal axis extending through the center of gravity and a transverse axis normal to the longitudinal axis extending through the center of gravity, a boom having an upper end for supporting a load carried by the frame, means pivoting the boom to the frame about an axis parallel to and displaced laterally from the longitudinal axis, and adjusting means interposed between the frame and the upper end of the boom for positioning the upper end in vertical alignment with the transverse axis.

The boom preferably comprises a pair of legs joined at the upper end and having lower ends disposed on opposite sides of the transverse axis. At least one of the legs is rendered extensible in accordance with one embodiment of the invention, in which case it may include a fluid jack. In a preferred form of the embodiment mentioned, each of the legs may include a hydraulic jack.

In accordance with an embodiment of the present invention, the lower ends of the legs may be supported by a beam adjustably mounted on the frame and the adjusting means may be interposed between the frame and the beam. In such a case, the beam may be pivotally mounted on the frame and the adjusting means may comprise one or more jacks, preferably of the fluid type. The beam may have an intermediate portion pivotally mounted on the frame and the adjusting means may comprise a pair of jacks disposed on opposite sides of the intermediate portion.

A more complete understanding will follow from a description of the accompanying drawings wherein:

FIG. 2 is a side elevation on a somewhat reduced scale of the vehicle of FIG. 1 depicting the vehicle on level ground;

FIG. 3 is a side elevation depicting the vehicle of FIG. 2 disposed on an incline;

FIG. 4 is a fragmentary elevation on an enlarged scale of the boom corresponding to its position in FIG. 2;

FIG. 5 is a fragmentary elevation on an enlarged scale depicting the boom in the position which it assumes in FIG. 3.

Figures 1, 6:
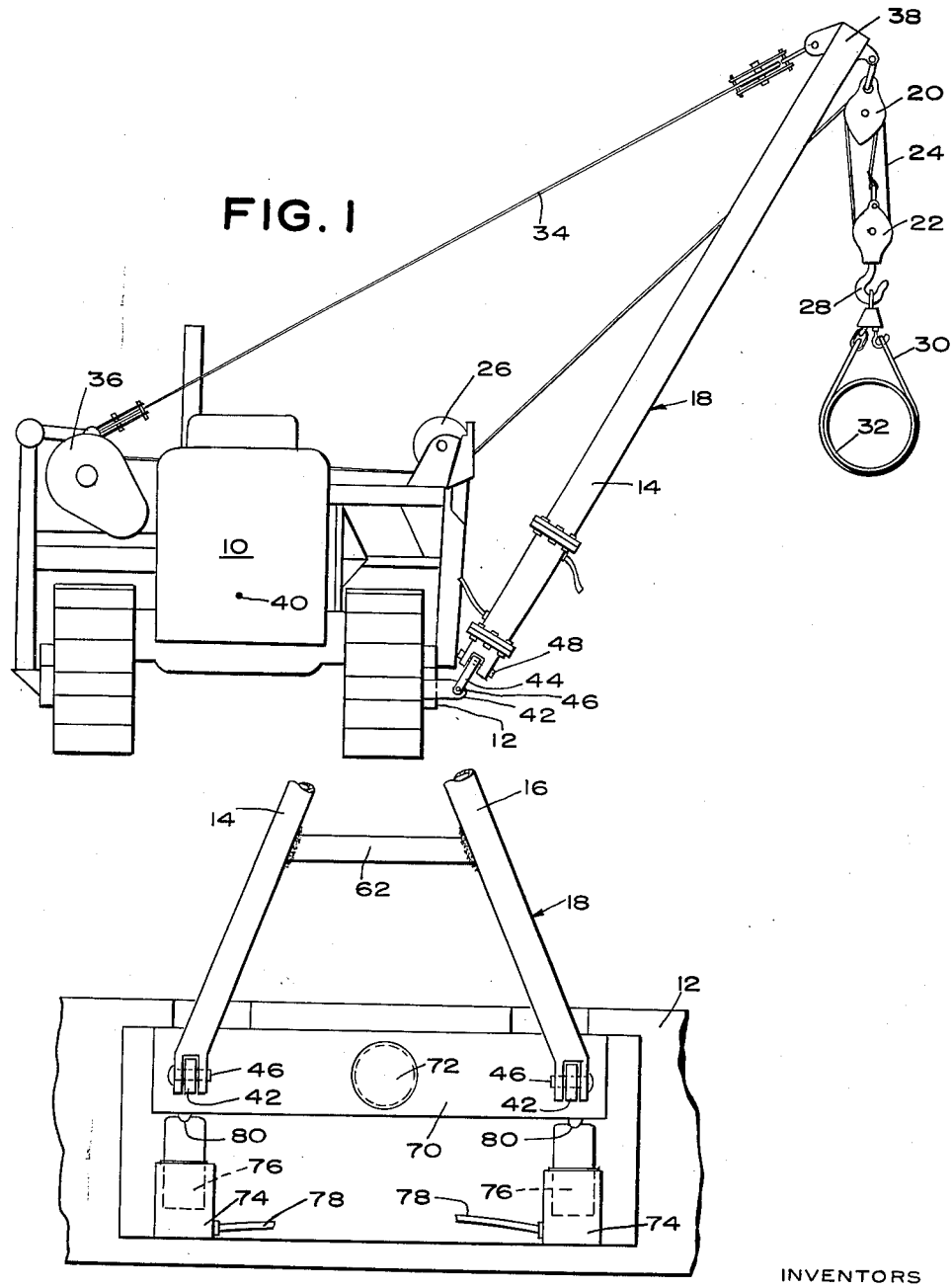
FIG. 1 is a rear elevation of a vehicle incorporating the present invention.
FIG. 6 is a fragmentary elevation showing the lower portion of a boom in accordance with a modification.

The tractor 10 provides a frame 12 supporting the legs 14 and 16 of a side boom 18, the legs converging at their upper ends from which a hoisting block 20 is suitably suspended. A lifting block 22 is connected to the hoisting block 20 by means of a cable 24 whose length is varied by means of a winch 26 carried by the tractor. The lifting block is provided with a hook 28 for engagement with a sling 30 suitable for raising and lowering a length of pipe 32. One or more cables 34 under the control of a winch 36 mounted on the tractor will be connected to the upper end 38 of the boom 18 for adjusting the boom pivotally about a fore and aft axis parallel to the longitudinal axis 40 extending through the center of gravity of the tractor. This pivotal movement is provided by the use of sockets 42 mounted on the tractor frame which receive the lower ends of links 44 carried by the legs of the boom. The joints between the sockets 42 and links 44 are effected by means of pintles 46. The upper ends of the links 44 are pivotally related to the lower ends of the boom legs by means of pintles 48 whose axes extend perpendicularly to those of the pintles 46. It is by virtue of these pintles 48 that the upper end of the boom can be shifted in a fore and aft direction relative to the tractor which carries it.

As depicted in FIGS. 1 to 5, each of the boom legs incorporates a cylinder 50 whose lower end is flanged and bolted to a flange carried by a bottom fitting 52 which receives the pintle 48. Each cylinder receives a piston 54 whose upper end terminates in a flange 56 which is bolted to a flange 58 carried by the lower end of each of the boom legs 14 and 16. From the construction thus far described, it will become evident that a hydraulic jack of this type or a jack of another type could be interposed in one or both legs of a conventional boom where the advantages of the present invention are desired. The ends of each cylinder are provided with fluid lines 60, suitably connected in a hydraulic system to extend or retract these pistons relative to their cylinders. Above the flanges 58 formed at their lower ends, the legs 14 and 16 of the boom are shown as provided with struts or braces 62 which may be welded or otherwise secured to the legs for purposes of rigidity to produce a configuration suggestive of the letter A.

With the equipment operating on level ground as depicted in FIG. 2, in order to have the center of the lifting block 22 in the transverse plane passing through the center of gravity of the tractor, the pistons of both legs may be in their retracted positions as shown. The transverse axis 64 has been depicted in FIGS. 2 and 3 as the axis extending transversely of the tractor through the center of gravity and perpendicular to the fore and aft axis 40 extending through the center of gravity. Thus, it is desirable that the block 22 of the boom always assume a position centered over a vertical line extending through the axis 64.

This relationship has been achieved with the vehicle operating on an incline as depicted in FIG. 3 by extending the leg 16 through the use of the hydraulic jack defined by the cylinder 50 and piston 54.

The lengths of the cylinders and piston will be selected in any case to provide the maximum degree of fore and aft motion of the boom required by the terrain to be encounterd. Where both legs of the boom are provided with these hydraulic jacks or rams, the equipment will accommodate itself to operation uphill and down. It is realized that some applications may require the use of only a single jack in one leg of a boom of the type under discussion.

In accordance with a modification, the lower ends of the legs 14 and 16 of a boom 18 may be pivotally connected to sockets 42 by means of pintles 46 for movement about an axis parallel to the fore and aft axis of the tractor, as shown in FIG. 6 where the sockets 42 are mounted on a beam 70 which is attached to the frame 12 by means of a pivot or shaft 72 whose axis extends transversely of the tractor, preferably through its center of gravity. Under these circumstances, the beam 70 will be rendered pivotal with respect to the tractor frame by means of cylinders 74 and their pistons 76 supplied with actuating fluid through hose lines 78. The upper ends of the pistons 76 may have arcuate engagement with abutments 80 carried by the beam 70 in order to eliminate unnecessary frictional effects.

Whereas the invention has been described with reference to only two embodiments of the invention, the many variations suggested thereby should be included in the coverage afforded by the appended claims.

We claim:

1. A handling vehicle comprising a frame, said vehicle having a center of gravity, a longitudinal axis extending through said center of gravity, and a transverse axis normal to said longitudinal axis extending through said center of gravity, a boom having an upper end movable to positions outboard of said vehicle in a transverse direction for supporting a load carried by said frame, means pivoting said boom to said frame about an axis parallel to and displaced laterally from said longitudinal axis, and adjusting means including a pivot having an axis substantially parallel to said transverse axis interposed between said frame and the upper end of said boom for positioning said upper end in a fore and aft direction relative to said vehicle to maintain vertical alignment with said transverse axis for various fore and aft inclinations of said vehicle.

2. A handling vehicle as set forth in claim 1 wherein said boom comprises a pair of legs joined at said upper end and having lower ends disposed on opposite sides of said transverse axis.

3. A handling vehicle as set forth in claim 2 wherein said lower ends are supported by a beam adjustably mounted on said frame, and said adjusting means is interposed between said frame and beam.

4. A handling vehicle as set forth in claim 3 wherein said beam is pivotally mounted on said frame.

5. A handling vehicle as set forth in claim 3 wherein said adjusting means comprises a fluid jack.

6. A handling vehicle as set forth in claim 3 wherein said adjusting means comprises a pair of jacks.

7. A handling vehicle as set forth in claim 3 wherein said beam has an intermediate portion pivotally mounted on said frame and said adjusting means comprises a pair of jacks disposed on opposite sides of said intermediate portion.

8. A handling vehicle comprising a frame, said vehicle having a center of gravity, a longitudinal axis extending through said center of gravity, and a transverse axis normal to said longitudinal axis extending through said center of gravity, a boom having an upper end movable to positions outboard of said vehicle in a transverse direction for supporting a load carried by said frame, means pivoting said boom to said frame about an axis parallel to and displaced laterally from said longitudinal axis, adjusting means including a fluid jack interposed between said frame and the upper end of said boom for shifting said upper end in a fore and aft direction relative to said vehicle to maintain vertical alignment with said transverse axis for various fore and aft inclinations of said vehicle, and control means for actuating said fluid jack from a remote portion of said vehicle.

9. A handling vehicle comprising a frame, said vehicle having a center of gravity, a longitudinal axis extending through said center of gravity, and a transverse axis normal to said longitudinal axis extending through said center of gravity, a boom having an upper end for supporting a load carried by said frame, means pivoting said boom to said frame about an axis parallel to and displaced laterally from said longitudinal axis, and adjusting means including a pivot having an axis substantially parallel to said transverse axis interposed between said frame and the upper end of said boom for positioning said upper end in a fore-and-aft direction relative to said vehicle to maintain vertical alignment with said transverse axis for various fore-and-aft inclinations of said vehicle, said boom comprising a pair of legs joined at said upper end and having lower ends disposed on opposite sides of said transverse axis, at least one of said legs being extensible.

10. A handling vehicle comprising a frame, said vehicle having a center of gravity, a longitudinal axis extending through said center of gravity, and a transverse axis normal to said longitudinal axis extending through said center of gravity, a boom having an upper end for supporting a load carried by said frame, means pivoting said boom to said frame about an axis parallel to and displaced laterally from said longitudinal axis, and adjusting means including a pivot having an axis substantially parallel to said transverse axis interposed between said frame and the upper end of said boom for positioning said upper end in a fore-and-aft direction relative to said vehicle to maintain vertical alignment with said transverse axis for various fore-and-aft inclinations of said vehicle, said boom comprising a pair of legs joined at said upper end and having lower ends disposed on opposite sides of said transverse axis, at least one of said legs including a jack.

11. A handling vehicle comprising a frame, said vehicle having a center of gravity, a longitudinal axis extending through said center of gravity, and a transverse axis normal to said longitudinal axis extending through said center of gravity, a boom having an upper end for supporting a load carried by said frame, means pivoting said boom to said frame about an axis parallel to and displaced laterally from said longitudinal axis, and adjusting means including a pivot having an axis substantially parallel to said transverse axis interposed between said frame and the upper end of said boom for positioning said upper end in a fore-and-aft direction relative to said vehicle to maintain vertical alignment with said transverse axis for various fore-and-aft inclinations of said vehicle, said boom comprising a pair of legs joined at said upper end and having lower ends disposed on opposite sides of said transverse axis, at least one of said legs including a fluid jack.

12. A handling vehicle comprising a frame, said vehicle having a center of gravity, a longitudinal axis extending through said center of gravity, and a transverse axis normal to said longitudinal axis extending through said center of gravity, a boom having an upper end for supporting a load carried by said frame, means pivoting said boom to said frame about an axis parallel to and displaced laterally from said longitudinal axis, and adjusting means including a pivot having an axis substantially parallel to said transverse axis interposed between said frame and the upper end of said boom for positioning said upper end in a fore-and-aft direction relative to said vehicle to maintain vertical alignment with said transverse axis for various fore-and-aft inclinations of said vehicle, said boom comprising a pair of legs joined at said upper end and having lower ends disposed on opposite sides of said transverse axis, each of said legs including a jack.

References Cited in the file of this patent

UNITED STATES PATENTS

| | | |
|---|---|---|
| 1,636,136 | Kernes | July 19, 1927 |
| 2,386,494 | Nagle | Oct. 9, 1945 |
| 2,712,873 | Peterson | July 12, 1955 |
| 2,755,943 | Payne et al. | July 24, 1956 |
| 2,847,134 | Slate | Aug. 12, 1958 |